UNITED STATES PATENT OFFICE.

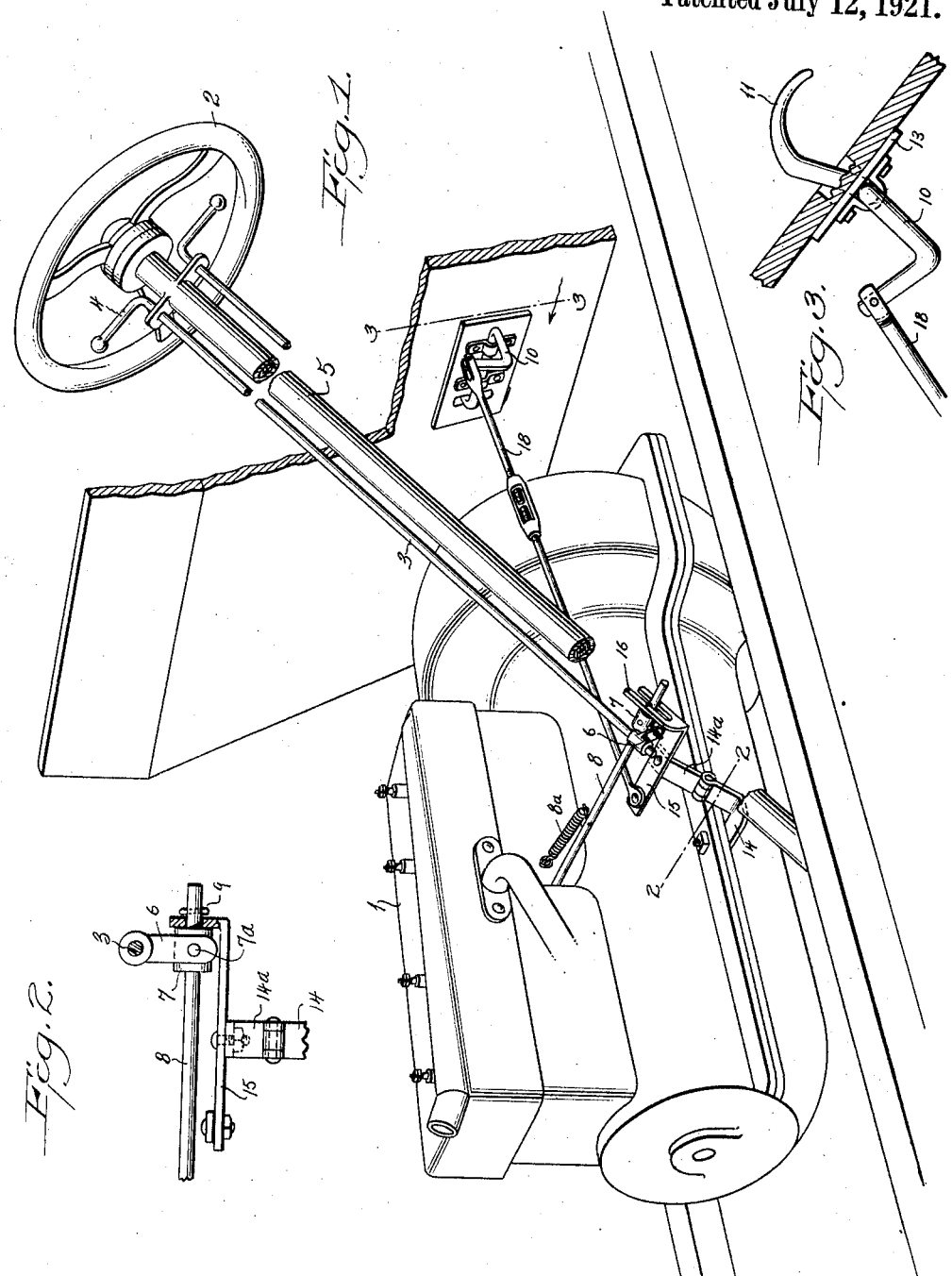

PLEAS E. VINEYARD, OF WINDOM, TEXAS.

ACCELERATOR FOR ENGINES.

1,384,415. Specification of Letters Patent. Patented July 12, 1921.

Application filed December 5, 1919. Serial No. 342,708.

*To all whom it may concern:*

Be it known that I, PLEAS E. VINEYARD, a citizen of the United States, residing at Windom, in the county of Fannin and State of Texas, have invented certain new and useful Improvements in Accelerators for Engines, of which the following is a specification.

This invention relates to a new and useful improved form of foot pedal or foot throttle to be used in connection with the throttle or carbureter control on an automobile engine and provides means for effectively controlling the speed of an engine by the action of the driver's foot against the foot throttle located in a convenient position on the floor of the car.

An object of the invention is to provide a suitably pivoted foot pedal arranged in connection with instrumentalities necessary to exercise a controlling relation over the throttle of the carbureter and to work in an independently conjoined relation with the present form of throttle control on automobiles, and especially in connection with throttle control on the Ford car.

A further object of the invention is to generally improve my Patent No. 1,274,823, and to incorporate a flexible hinge mount to support the throttle control device shown in the patent mentioned. It is a purpose to provide a flexible hinged supporting means for the throttle control in order to compensate for the swing movement of certain parts used in the device.

With the above and other objects in view the invention has relation to a certain combination and arrangement of parts, an example of which is described in the following specification, pointed out in the appended claims and illustrated in the accompanying drawings; wherein, Figure 1 illustrates a perspective view of a form of automobile engine and steering column with accessory throttle control.

Fig. 2 shows a detail view of the parts of the accelerator somewhat enlarged, this view being developed in part from the line 2—2 of Fig. 1.

Fig. 3 shows a side view of the pedal as taken on the line 3—3 of Fig. 1.

A throttle control device constructed in accordance with the conception of my invention makes use of a bracket which may be secured to any convenient part of the engine or frame of a car, and a hinged member is carried on the bracket. A bell crank is pivoted on the upper end of the hinged member and coöperates with an actuating rod and the control throttle rod to govern the opening and closing of the carbureter of the automobile engine. A foot throttle control or accelerator control is connected with the bell crank and functions to control said carbureter independently of the hand throttle control.

Referring now more in particular to the drawings, wherein the same parts throughout are designated by identical reference characters, the numeral 1 points out any form of automobile engine which is provided with a carbureter and throttle control mechanism located adjacent to the steering wheel. In this instance a steering wheel 2 is provided with a means of throttle control comprising a rod 3 with an integral hand actuating lever 4. This member 3—4 is arranged alongside the steering column 5 and adapted to be revolved through a partial revolution by manipulation of the hand lever 4 by the driver. An arm 6 is fixed upon the rod 3 and pivotally connects with a lug or pin 7ª which is integrally formed with a cuff 7 slidably confined upon a rod 8. A pin 9 is fixed in the rod 8 just forward of the cuff 7 for the purpose of limiting the travel of the cuff 7 upon the throttle control member 8ª. A coil tension spring 8 is fixed to the rod and to some point on the engine for the purpose of keeping the rod in an inwardly and normally limited position. The rod 8 passes through the space between the cylinders of the engine and has connection with the throttle in the carbureter located on the opposite side thereof. This assembly of parts permits the control member 8 to move back and forth in sliding contact with the cuff 7 independently of the rod 4.

A foot control device comprising a bell crank 10 integrally formed with a foot pedal 11 is pivoted upon a plate 13 by suitable bearings and passes through a slotted opening formed in the floor piece of the car. The plate upon which the pedal member is journaled is secured to the underneath side of the floor, and in a position convenient to the driver, that he may reach the same with his foot.

A bracket 14 is fixed on the engine or to any suitable structural part of the car, and a hinge plate 14ª is pivoted on the upper end of the bracket. A bell crank 15 is pivoted on the hinge plate 14ª and adapted to swing freely on said plate. The upper end of the plate 14ª will preferably be bent at a slight angle in order to properly position the bell crank 15. The bell crank 15 has one of its arms bifurcated to form a fork 16, and the fork receives the rod 8. The fork is interposed between the point 9 and the cuff 7. The fork has just sufficient play between the cuff and the pin to avoid binding when the ball crank is actuated. A link or rod 18 is pivotally connected with the bell crank 10 of the foot pedal 11 and the bell crank 15 to establish a movable control from the foot pedal 11 to the bell crank 15. A turn buckle 19 is included in the rod for the purpose of adjusting the length of said rod.

In the operation of this form of throttle accelerator the driver of the car is provided with the foot pedal 11 and hand control 4 for controlling the speed of his car, one of which is adapted to work independently of the other in such a manner that the driver can depress the foot pedal 11 causing the bell crank 15 to move along the rod 8 and come in contact with the pin 9, at which time the rod 8 moves forward causing the throttle to be opened by the regulated movement imparted to the foot pedal.

In a similar manner the driver of the car may manually operate the hand control lever 4 which will cause the arm 6 and correlated cuff 7 to move along the throttle control rod 8 until the cuff 7 has contacted the fork 16 at which juncture the throttle control rod is again moved forward to regulate the opening of the throttle.

The specially designed foot pedal shown in Fig. 3 should be used in connection with the accelerator parts constituting my invention. The curved foot pedal should be formed on a radius about equal to the throw of the bell crank in order that the foot of the operator may work smoothly over the pedal contour as it is depressed. This type of pedal will enable the driver to more gradually feed the motor and secure a steadier and more uniformly smooth operation of the automobile. It will not slip under the foot on rough roads, and is very effective for cross country driving.

The elements constituting my invention are few in number and simplified in design and capable of being applied to a Ford car or other automobile in a short time, and its use makes driving the car more convenient and restful, and also gives economy to the operation of the engine since the use of the foot accelerator keeps the engine throttle to a minimum speed when the engine is not in motion.

The present invention is presented as an improved form over my previous patent and provides a device superior in operation, smooth and flexible in movement, and one in which the several parts will not bind, due to the swing or pivotal action of the bell crank 15 and arm 6. When the arm 6 swings about its axis there would be a binding of the parts if not for the action of the hinge leaf 14ª which compensates for this tendency by undergoing a slight movement on the pivot pin 14ᶜ, and in this manner there is brought about the desired smoothness in motion of the parts.

Having thus described my invention, what I claim as new and desire to secure by Letters Patent is:

1. In a foot accelerator for controlling the throttle movement of an engine, the combination with a bell crank pivoted in some suitable position upon the engine, a throttle control rod, a foot pedal device correlated with the bell crank for the purpose of controlling same, of a cuff slidably confined upon the throttle control rod, a hand control lever arranged adjacent to the steering wheel, and a suitable connecting arm fixed upon the control lever and having pivotal connection with the cuff and a flexible bracket fixed to the engine and adapted to support the accelerator device.

2. An accelerator for engines to control the throttle thereof, said accelerator being of the type which employs a bell-crank with a pedal and rod connection to work the bell-crank, and a rod connection from the bell-crank to the engine throttle, and characterized as new in that a bracket made of hinged sections is anchored to any suitable point of support and pivotally supports the accelerator so that sufficient flexibility is derived to make a smooth operating mechanism.

In testimony whereof I affix my signature.

PLEAS E. VINEYARD.